United States Patent
Roth et al.

(10) Patent No.: US 6,313,739 B1
(45) Date of Patent: Nov. 6, 2001

(54) DEVICE FOR SENSING AN OBJECT OR A PERSON IN THE INTERIOR OF A VEHICLE AND METHOD FOR OPERATING SUCH A DEVICE

(75) Inventors: Christoph Roth, Tokyo (JP); Alexander Waldmann, Regensburg (DE); Reinhard Hamperl, Koefering (DE); Thomas Stierle, Regensburg (DE); Reinhard Roesl, Wenzenbach (DE); Gerhard Mader, Thalmassing (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/513,613

(22) Filed: Feb. 25, 2000

(30) Foreign Application Priority Data

Feb. 25, 1999 (EP) .................................................. 99103693

(51) Int. Cl.⁷ ..................................................... B60R 25/10
(52) U.S. Cl. .............................. 340/426; 701/49; 701/45; 318/467; 280/735; 180/273; 340/457
(58) Field of Search ....................... 701/49, 45; 318/467; 280/735; 80/273; 340/426, 425.5, 457, 459

(56) References Cited

U.S. PATENT DOCUMENTS 6,078,854 * 6/2000 Breed et al. ........................... 701/49

FOREIGN PATENT DOCUMENTS

| 19707590A1 | 9/1998 | (DE) . |
| 0497364A1 | 8/1992 | (EP) . |
| 0734921A2 | 10/1996 | (EP) . |

* cited by examiner

*Primary Examiner*—Daryl Pope
(74) *Attorney, Agent, or Firm*—Herbert L. Lerner; Laurence A. Greenberg; Werner H. Stemer

(57) ABSTRACT

A sensor which is installed in a vehicle, for sensing an object or a person, is operated for adjustment purposes in a test mode. The installation position of the sensor or of the device in the vehicle is changed with an adjustment device as a function of the evaluation of the test data which are determined. Alternatively, or in addition, a message can be issued as a function of the result of the evaluation. The invention ensures that the device is installed at a precise location in the vehicle and the position of vehicle occupants is thus determined precisely.

17 Claims, 3 Drawing Sheets

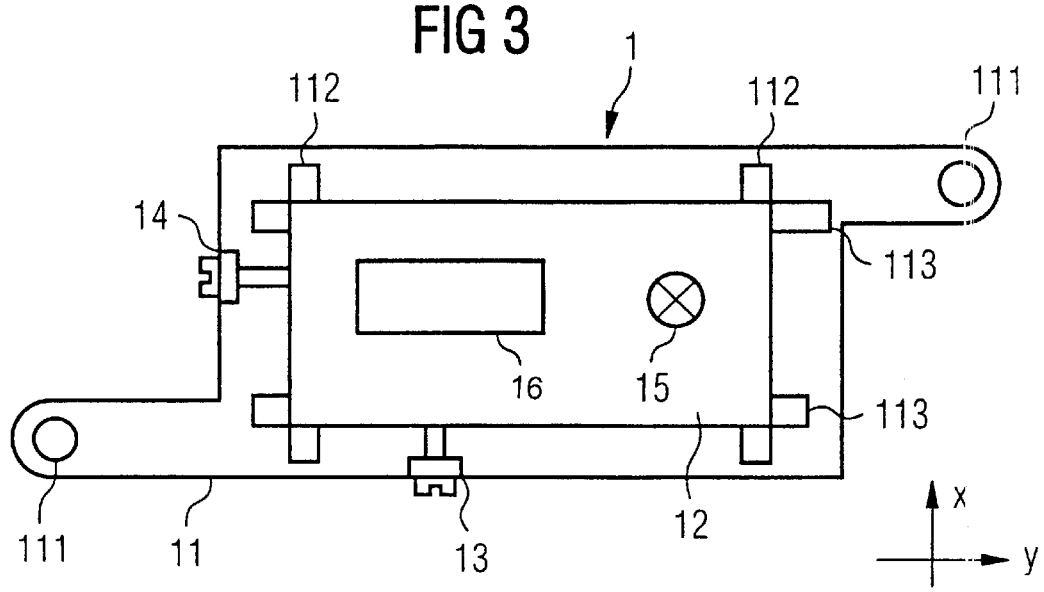
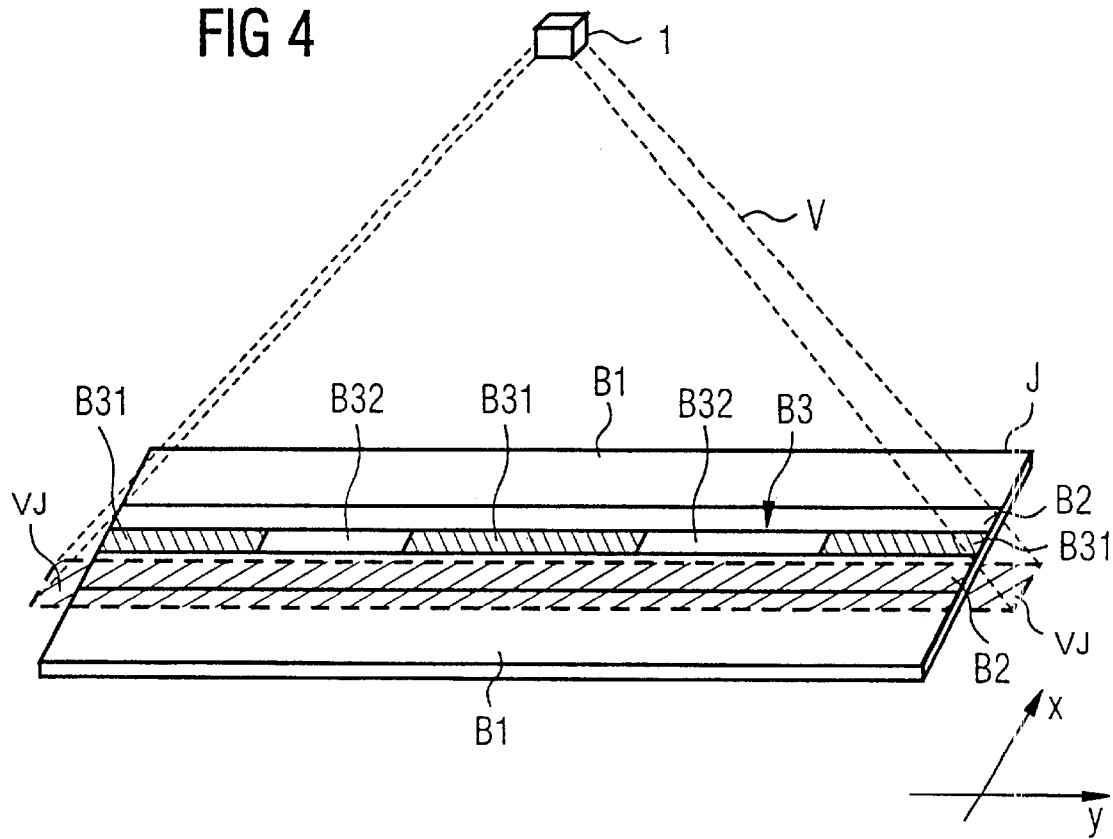

DEVICE FOR SENSING AN OBJECT OR A PERSON IN THE INTERIOR OF A VEHICLE AND METHOD FOR OPERATING SUCH A DEVICE

BACKGROUND OF THE INVENTION

Field of the Invention

The invention lies in the automotive technology field. More specifically, the invention relates to a device for sensing an object or a person in the interior of a vehicle. A sensor is provided for this purpose. The device includes an attachment member with which the device is attached to the vehicle in a given position and with a given orientation for the sensor. The invention also pertains to a related operating method for a device for sensing an object or a person in the interior of a vehicle.

Persons who are displaced far forward in the direction of the dashboard—such as children in rearward facing child or infant seats that are placed on the front passenger seat—are subjected to the hazard, during the operation of a motor vehicle provided with an airbag, of suffering injuries as result of the inflation impact of the airbag in the event of an accident. Modern occupant protection control systems aim at switching off the airbag in such situations or inflating it with reduced force and speed in order to avoid the risk of injury to a vehicle occupant. It is thus necessary to determine the position of the vehicle occupant in the vehicle. In order to determine the position of the vehicle occupant, use is preferably made of contactless, optical sensors.

European published patent application No. 0 669 227 A1 discloses a device for the contactless detection of an object or of a person in the interior of a vehicle. There, the vehicle seat is irradiated by a number of LEDs. The beams which are reflected from the seat or a person or an object on the vehicle seat are registered by a photodetector field.

The location at which such a device is installed in the vehicle, for example, on the A pillar, on the B pillar, or on the roof lining, integrated with the interior lighting if appropriate, can generally be specified by the manufacturer of the vehicle only with a tolerance of approximately ±5% with respect to a fixed point in the vehicle. Manufacture-related tolerance chains in the bodywork of the vehicle do not permit the place of installation to be determined more precisely. However, a local tolerance of 5% already results, for a scanning device using optical scanning, in an angular deviation of the beam path of a maximum of 18° with respect to a fixed object that is to be scanned. In the case of an assumed function area of the device—also referred to as range—of one meter—the measuring point can be displaced by approximately 30 cm. Such a tolerance in the sensing of objects or persons for the purpose of switching off an airbag or the appropriate metering of an airbag is not acceptable for safety reasons. Hazardous situations are not detected owing to such an indeterminate installation position of the device, or are assessed incorrectly because, although the device is operating without faults per se, it is not monitoring the intended area owing to its incorrect installation position.

SUMMARY OF THE INVENTION

It is accordingly an object of the invention to provide a device and a method for sensing the position of persons or other objects in a vehicle interior, which overcomes the above-mentioned disadvantages of the heretofore-known devices and methods of this general type and which enables sensing such objects in the interior of the vehicle within precise tolerances.

With the foregoing and other objects in view there is provided, in accordance with the invention, an improved device for sensing an object in an interior of a vehicle of the type having a sensor for sensing an object in the interior and an attachment for attaching the device to the vehicle, whereby the sensor assumes a given position and a given orientation. The improvement is found in an adjustment device for changing the position or the orientation of the sensor or of the device in the vehicle after an installation thereof in the vehicle.

In accordance with an added feature of the invention, the adjustment device includes at least one positioning screw for changing the position or the orientation of the sensor or the device.

In accordance with an additional feature of the invention, the be adjustment device is designed to change the position or the orientation of the sensor or of the device in two spatial directions.

In accordance with another feature of the invention, the sensor includes a transmitter for outputting a signal and a receiver for receiving the signal after reflection or scattering thereof at the object.

With the above and other objects in view there is also provided, in accordance with the invention, a method of operating a device for sensing an object in an interior of a vehicle, which comprises:

operating a sensor for sensing an object installed in the vehicle in a test mode and acquiring test data;

evaluating the test data acquired in the test mode; and changing a position or an orientation of the sensor or of the device in the vehicle with an adjustment device or generating an adjustment signal in dependence on a result obtained in the evaluating step.

In accordance with again an added feature of the invention, the method further comprises:

providing an object containing areas with different scattering or reflection properties;

irradiating, in the test mode, the object with a transmitter of the sensor; and registering a radiation reflected or scattered at the object and evaluating the data thus acquired.

In accordance with again an additional feature of the invention, the acquired data represent a scattering pattern or reflection pattern of the irradiated object, and the method further comprises:

comparing the acquired data with stored data for a predefined scattering pattern or reflection pattern; and changing the position or the orientation of the sensor or of the device if the acquired data deviate from the stored data by a predefined value.

In accordance with again another feature of the invention, the test mode is started after the vehicle door is locked.

In accordance with again a further feature of the invention, the evaluating step comprises evaluating the acquired data in order to determine a maximum intensity of the reflected or scattered radiation.

In accordance with yet an added feature of the invention, the position or the orientation of the sensor or of the device is changed or the adjustment signal is generated until the reflected or scattered radiation has a maximum intensity (due to the change in position/orientation and/or due to the weighting of the signal).

In accordance with yet another feature of the invention, the device or the sensor is locked in that position or that orientation in which the reflected or scattered radiation has a maximum intensity. Alternatively, the device or the sensor is locked in that position or that orientation in which the acquired data drop below the predefined value of the stored data.

Other features which are considered as characteristic for the invention are set forth in the appended claims.

Although the invention is illustrated and described herein as embodied in a device for sensing an object or a person in the interior of a vehicle and operating method for such a device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a diagrammatic plan view of a device according to the invention;

FIG. 4 is a perspective view showing the method according to the invention, explained with reference to an irradiation pattern;

Description of the Preferred Embodiments

Figure 1:
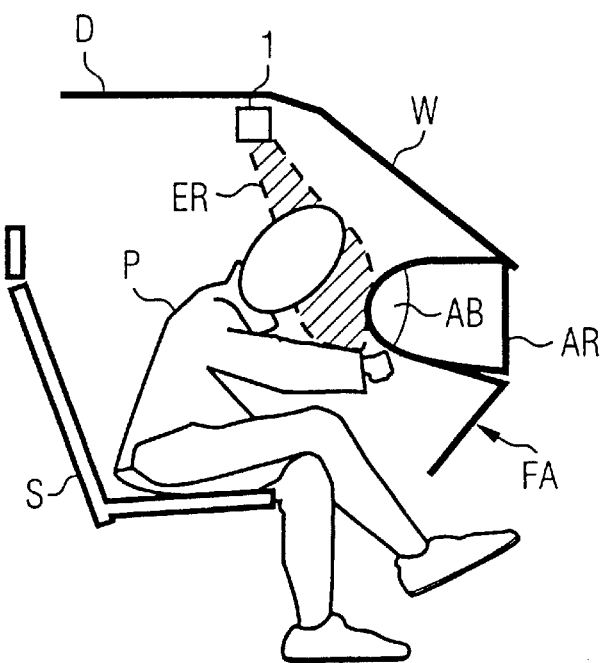
FIG. 1 is a diagrammatic section through a passenger cell of a motor vehicle.

Referring now to the figures of the drawing in detail and first, particularly, to FIG. 1 thereof, there is seen a longitudinal section through the front part of the passenger cell, on the front seat passenger's side. All of the pertinent elements are drawn symbolically. The interior of the vehicle is bounded by a roof D, a windshield W, a dashboard AR and a foot rest FA. It will be understood, of course, that the roof D, and thus a completely enclosed passenger cell, need not necessarily be present. A vehicle seat S is shown on which a person P is seated with a position of the upper part of the body which is displaced forward. A device 1 for sensing an object or a person is arranged in an installation position on the roof D. The device 1 and in this case particularly the sensor of the device has an indicated effective range ER. The sensor is thus spatially oriented in such a way that it can scan the effective range ER optically. The dashboard AR contains a front seat passenger airbag module AB in the folded-up state. In the unfolded state, the front seat passenger airbag shoots in the direction toward the head of the indicated person P. It is clear that with the indicated device for detecting objects the hazard area in front of a folded-up airbag module AB is to be monitored in the inflation direction. If an occupant or a child seat is detected in this effective range ER, the front seat passenger airbag module AB is prevented from being triggered, or is triggered in a suitably metered fashion. However, the device 1 can be directed at the vehicle seat S and sense when a person moves out of his normal seated position. Devices are also conceivable which sense the entire front part of the interior of the vehicle with a plurality of sensors and register any types of positions of objects or persons. The invention is therefore not restricted to specifically detecting an image of an object or of a person, but instead in particular also for monitoring a specific region or a specific zone in the interior of the vehicle for the presence of an object or a person. The invention is designed to register in a contactless fashion.

The sensor of the device scans its effective range by means of optical radiation, in particular infrared radiation. However, radiation with other wavelengths can also be applied. The sensor contains an LED, in particular an infrared transmitter in the form of a laser diode which emits one or more beams or beam curtains. The sensor also contains one or more optical receiver elements in the form of photocells which pick up the radiation after its reflection or scattering at an object or a person. By evaluating the reflected or scattered radiation, the distance between the sensor and the object and, if appropriate, contouring and precise determination of the position can be determined in two-dimensional or three-dimensional space. However, a camera can also be used to record an image. In addition, a heat sensor in the form of an infrared pickup can be used as a sensor for detecting a person. The sensor can also carry out ultrasound measurements or microwave measurements.

Figure 2:
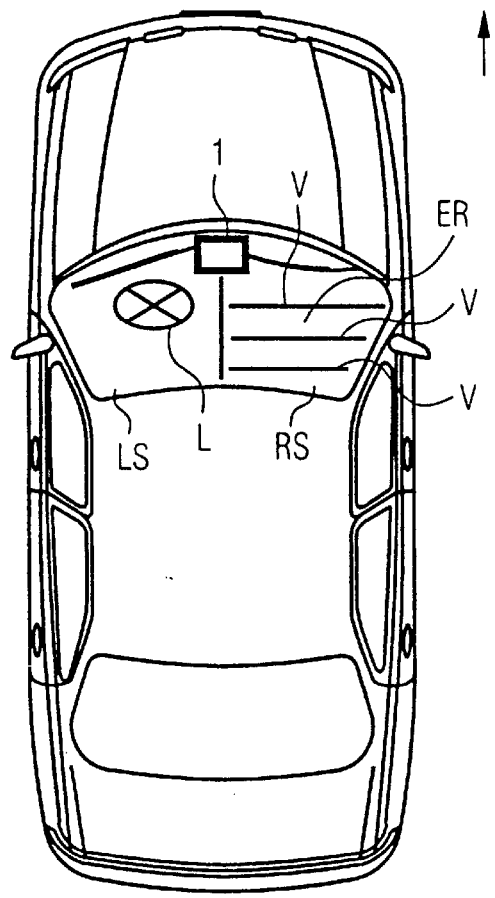
FIG. 2 is a plan view of a vehicle.

FIG. 2 shows a plan view of a motor vehicle in which the windshield, the rear window and the side windows can be seen as cutouts. A device 1 according to the invention is arranged in the forward area in the vehicle interior. All references to forward, rearward, and the like, are understood to be with reference to the normal direction of travel of the vehicle. In addition, the diagrams show the driver's side LS with the steering wheel L and the front seat passenger's side RS. The effective direction W of a sensor of the device 1 is shown by an area of lines. Each line within the effective sector W characterizes an optical curtain V in the vertical plane. Each curtain V performs the function of a photoelectric barrier. If an object moves within the effective sector W of the sensor, the object intersects at least one of the optical curtains V. Three-dimensional detection of persons or object is thus ensured if a two-dimensional reception field is provided, and the third, vertical dimension is acquired by means of an evaluation of the strength, of the power or of the energy content of reflected radiation using the propagation time method or triangulation method.

FIG. 3 shows a device according to the invention in plan view. The device 1 contains a baseplate 11 with attachment flanges 111, two longitudinal guides 112, and two lateral guides 113. In addition, the device has a housing 12 and adjustment screws 13 and 14.

The baseplate 11 is fitted with the housing 12 which contains the actual functional elements of the device 1. The baseplate 11 which is preferably manufactured from plastic or metal is attached by means of its attachment flanges 111 at the installation position provided for the device on the bodywork of the vehicle or on another component of the vehicle, for example by means of a screwed connection. The housing 12 includes non-illustrated components such as a sensor, control circuit and/or evaluation circuit, interface, plug, etc. Only a diagrammatic indication of a transmitter 15 (e.g., laser diodes, LED) and a receiver array 16 is provided. The housing 12 is arranged on the two lateral guides 113 in such a way that it can be displaced in the Y direction. The lateral guides 113 themselves are arranged on the two longitudinal guides 112 in such a way that they in turn can be displaced in the X direction. Here, the housing 12 is prestressed with respect to the lateral guides 113, and the lateral guides 113 are also prestressed with respect to the longitudinal guides 112 against a spring. The adjustment screws 13 and 14 are connected to the baseplate 11 by means of a bracket. By tightening the adjustment screw 13, the housing 12 is displaced, together with the sensor for sensing an object or a person, counter to the spring force in the X direction as a function of the number of revolutions of the screw which are made. By rotation in the adjustment screw 14, the housing 12 is displaced together with the sensor in the Y direction counter to the spring force. The adjustment screws 13 and 14 thus form an adjustment device for changing the installation position of the sensor or of the device in the vehicle by means of the attachment clips after the sensor/device has been installed in the vehicle. In addition, an adjustment screw may be provided which permits the device to be pivoted with respect to the spatial axis running in the plane of the drawing, thus allowing the orientation of the sensor to be changed. The mechanical connection between the housing and the baseplate then has to be appropriately adapted.

After the installation of the device in the vehicle, the adjustment screws 13 and 14 permit a two-dimensional change of the installation position of the sensor. The maximum deflections which can be implemented in the respective directions by means of the adjustment screws are preferably determined here by means of the tolerance specifications of the place of installation which have been converted into length measurements by the manufacturers of the motor vehicle. However, the invention is not restricted to an adjustment device described according to FIG. 3. According to the invention, adjustment devices which are of different construction and which at least permit the sensor, or else the entire device, to be displaced at least in one spatial direction, may also be used. The device accordingly provides the possibility of using a suitable operating method to secure, in particular, the optical sensor of the device, in its installation position in such a way that it monitors the area of the motor vehicle intended for it. This ensures a precise system for detecting objects or vehicle occupants, which, as a reliable transmitter of information, can reduce or suppress the inflation of an airbag.

The operating method according to the invention will now be explained with reference to FIGS. 4 and 5. According to FIG. 4, data are registered in a test mode of the sensor which is already installed in the vehicle, or of the device which is already installed in the vehicle. The position of the sensor is changed by means of the adjustment device as a function of the evaluation of such sensing data. The repeated outputting of radiation and the picking up of the radiation reflected at an object can be used to determine the current installation position of the sensor. If this installation position deviates from a predefined, and preferably stored reference installation position, the sensor or the device is appropriately adjusted by means of the adjustment device. Renewed measurement supplies the new installation position after the adjustment device has been activated. That position is subsequently in turn compared with the stored reference position. This process is repeated until the actual installation position corresponds with the reference installation position.

A microprocessor is used in the preferred embodiment, both to actuate optical transmitters of the sensor and to evaluate reflected radiation and reconcile sensing data which are registered in this way with data that are stored in a memory. The resetting of the adjustment device owing to a discrepancy between a reference installation position and the at least indirectly determined actual installation position can be carried out manually or electromechanically, for example by means of an appropriate setting signal to an adjustment which can be activated electromotively. An electromotive adjustment device which is of the appropriate design can also be designed to be plugged on, for adjustment purposes, to the device of the sensor at the production line of the motor vehicle manufacturer. A display device informs the user if the sensor is oriented in the best possible way. The setting signal of the adjustment device can therefore be understood to be an adjustment signal, as can the signal for indicating that the best possible orientation of the sensor has been obtained. However, the adjustment signal can also actuate an optical or acoustic display unit, and thus indicate that it is necessary to change the installation position or the orientation further.

The actual installation position is determined as follows: in the test mode an optical signal is directed at an object containing a marked pattern. A pattern of this object should be marked in terms of the object having areas with different reflective or scattering factors. According to FIG. 4, an adjustment template is moved, as object J, into the beam path of a device 1 according to the invention. The adjustment template J is of planar design and contains various areas B, in particular three areas B1 to B3 being provided with different reflective or scattering factors. The outer areas B1 have here a low tendency to scatter. In the areas B2, the tendency to scatter is B2>B1. In contrast, the central area B3 has a pronounced tendency to scatter. The reflectivity or tendency to scatter of such an adjustment template is caused by its surface roughness, its color, its reflective properties, the basic material, etc. In the example according to FIG. 4, the curtain V covers edges of the areas B1 and B2 with its projection field VJ which is projected onto the adjustment template J. An optical receiver of the device 1 will therefore perceive reflected radiation with a low to medium intensity. By comparing this intensity with a reference intensity, the sensor is adjusted, using an adjustment facility of the device, in such a way that its beam path V is displaced in the X direction. The field VJ on the adjustment template J thus increasingly covers areas B2 with a relatively high reflective property. An evaluator of the device 1 detects the increased intensity of the reflected radiation by reference to the evaluation of the sensing data supplied by the sensor. The sensor is adjusted, using the adjustment device, in the X direction to such an extent that either an intensity limiting value of the reflected radiation is reached or until a maximum intensity in the reflected signal has been exceeded. Alternatively, the reference installation position can then be considered to have been reached if the intensity value which is determined lies within tight tolerances of a reference intensity value.

After the sensor has been adjusted in the X direction, the positioning device can be locked for the X direction. If the sensor of the device 1 supplies a plurality of beam curtains V, it is sufficient to adjust the sensor with reference to one beam curtain V, provided that the transmitters of the individual beam curtains are mechanically coupled to one another.

After the sensor has been adjusted in the X direction, the sensor can be adjusted in the Y direction if it is sensitive to the Y direction. According to the present example, the sensor can preferably have five photoreceivers which are assigned to one transmitter and which enable intensity differences in the Y direction to be detected. For adjusting the sensor in the Y direction, the adjustment template has in turn, in its area B3, five fields with different tendencies to scatter. The fields which are indicated by B31 have a lower reflection factor than the fields which are indicated with B32. The adjustment in the Y direction is carried out in accordance with the method above for adjusting the sensor in the X direction.

The adjustment template should be arranged at a maximum possible distance from the sensor for the sake of maximum possible sensitivity of the adjustment method. The adjustment template can be arranged, for example, between the two front doors of the motor vehicle, with the result that the upper side of the reflections runs across the entire front area of the passenger compartment. Care is to be taken to ensure that the adjustment template is arranged at a precise location, because it constitutes the basis for the orientation of the system. This operating method is preferably applied when the device is put into service in the vehicle. It can also be applied when the vehicle is in the workshop for routine checking or for repair.

In a further method according to the invention, a beam curtain of the sensor is directed at an object which can be unambiguously detected again. Such objects, by way of example, are a portion of a seat, the gear lever, the stick shift base, or the center console. Given correct orientation, the reflected signal supplies a predefined level of intensity which is stored as a variable for a reference installation position in a memory of the device. If the installation position of the sensor deviates again from the reference installation position of the sensor, the sensor is adjusted by means of the adjustment device. However, the aim may also be to detect an unambiguous scatter pattern at the object. The best possible orientation of the sensor is then considered to have been detected if the registered pattern largely corresponds to a stored pattern. The high degree of correspondence is determined here by means of a deviation from the predefined pattern within tight limits.

An advantage of this operating method is that adjustment can be carried out even after the device has initially been put into service in the vehicle. This operating method is preferably carried out when the doors of the vehicle are locked. Locking of the doors provides an indication that the occupants have left the vehicle and that the object which has been selected for adjustment purposes is not covered by persons or objects.

Figure 5:
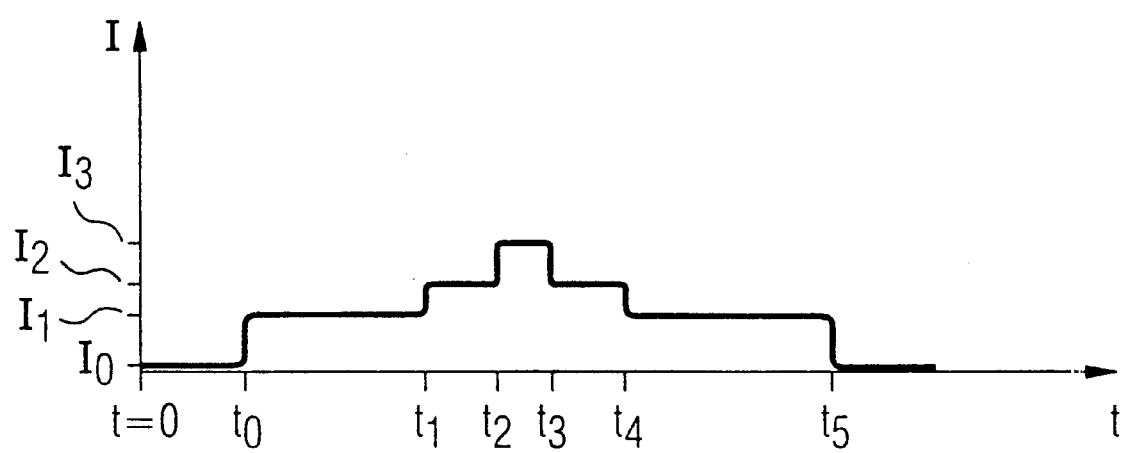
FIG. 5 is a graphical representation of a radiation intensity profile, registered during the application of the irradiation pattern of FIG. 4.

FIG. 5 shows the registration of intensities as sensing data over time t during swiveling of the sensor over time in the X direction by means of the adjustment template according to FIG. 4, starting outside the adjustment template at the time t=0 and $t_0$. The displacement speed of the sensor is constant here. The different intensities $I_1$ to $I_3$ which are sensed allow the passage of the beam curtain through the areas B1 to B3 to be detected.

The method and device according to the invention can be used to provide a low-tolerance installation position of the sensor without the need for mechanical interventions at the sensor itself.

The term "object" as used in the following claims should be understood to cover animate objects as well as inanimate objects, such as, for example, persons, child seats, and the like.

We claim:

1. A device for sensing an object in an interior of a motor vehicle, the device comprising:
    a sensor for sensing an object in an interior of a motor vehicle, said sensor including a transmitter for outputting a signal and a receiver for receiving the signal after reflection or scattering thereof at the object;
    an adjustment device attached to said sensor; and
    a base member for attaching said adjustment device to a component of the vehicle;
    said adjustment device for, after said base member has been attached to the component of the vehicle, changing one of the position and the orientation of said sensor relative to the component of the vehicle.

2. The device according to claim 1, wherein said adjustment device includes at least one positioning screw for changing one of the position and the orientation of one of the sensor and the device.

3. The device according to claim 1, wherein said adjustment device is adapted to effect a change in one of the position and the orientation of the sensor or of the device in two spatial directions.

4. A method of operating a device for sensing an object in an interior of a vehicle, which comprises:
    providing an object containing areas with different scattering or reflection properties;
    operating a sensor, installed in the vehicle, in a test mode;
    in the test mode, irradiating the object with a transmitter of the sensor;
    in the test mode, registering a radiation reflected or scattered at the object;
    evaluating data acquired from the registered radiation; and
    changing a position or an orientation of the sensor or of the device relative to a component in the vehicle with an adjustment device in dependence on a result obtained in the evaluating step.

5. The method according to claim 4, wherein the acquired data represent a scattering pattern or reflection pattern of the irradiated object, and the method further comprises:
    comparing the acquired data with stored data for a predefined scattering pattern or reflection pattern; and
    changing the position or the orientation of the sensor or of the device if the acquired data deviate from the stored data by a predefined value.

6. The method according to claim 5, which comprises starting the test mode after a vehicle door is locked.

7. The method according to claim 4, wherein the evaluating step comprises evaluating the acquired data in order to determine a maximum intensity of the reflected or scattered radiation.

8. The operating method according to claim 7, which comprises changing the position or the orientation of the sensor or of the device until the sensor has reached a position or an orientation in which the reflected or scattered radiation has a maximum intensity.

9. The method according to claim 4, which comprises locking the device or the sensor in that position or that orientation in which the reflected or scattered radiation has a maximum intensity.

10. The method according to claim 4, which comprises locking the device or the sensor in that position or that orientation in which the acquired data drop below the predefined value of the stored data.

11. A method of operating a device for sensing an object in an interior of a vehicle, which comprises:
    providing an object containing areas with different scattering or reflection properties;
    operating a sensor, installed in the vehicle, in a test mode;
    in the test mode, irradiating the object with a transmitter of the sensor;
    in the test mode, registering a radiation reflected or scattered at the object;
    evaluating data acquired from the registered radiation;
    generating an adjustment signal in dependence on a result obtained in the evaluating step; and
    using the adjustment signal to change a position or an orientation of the sensor or of the device relative to a component in the vehicle in dependence on a result obtained in the evaluating step.

12. The method according to claim 11, wherein the acquired data represent a scattering pattern or reflection pattern of the irradiated object, and the method further comprises:

comparing the acquired data with stored data for a predefined scattering pattern or reflection pattern; and generating the adjustment signal if the acquired data deviate from the stored data by a predefined value.

13. The method according to claim 12, which comprises starting the test mode after a vehicle door is locked.

14. The method according to claim 11, wherein the evaluating step comprises evaluating the acquired data in order to determine a maximum intensity of the reflected or scattered radiation.

15. The operating method according to claim 14, which comprises generating the adjustment signal until the sensor has reached a position or an orientation in which the reflected or scattered radiation has a maximum intensity.

16. The method according to claim 11, which comprises locking the device or the sensor in that position or that orientation in which the reflected or scattered radiation has a maximum intensity.

17. The method according to claim 11, which comprises locking the device or the sensor in that position or that orientation in which the acquired data drop below the predefined value of the stored data.

* * * * *